US012069531B2

(12) United States Patent
Li

(10) Patent No.: US 12,069,531 B2
(45) Date of Patent: Aug. 20, 2024

(54) METHOD AND APPARATUS FOR TRIGGERING TERMINAL BEHAVIOR BASED ON ENVIRONMENT AND TERMINAL STATUS PARAMETERS

(71) Applicant: Huawei Technologies Co., Ltd., Shenzhen (CN)

(72) Inventor: Zijun Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 193 days.

(21) Appl. No.: 17/363,895

(22) Filed: Jun. 30, 2021

(65) Prior Publication Data
US 2021/0329526 A1    Oct. 21, 2021

Related U.S. Application Data

(63) Continuation of application No. 16/465,789, filed as application No. PCT/CN2017/088308 on Jun. 14, 2017, now Pat. No. 11,082,906.

(30) Foreign Application Priority Data

Dec. 2, 2016    (CN) .................. 201611097005.6
Mar. 28, 2017    (CN) .................. 201710194152.3

(51) Int. Cl.
H04W 36/32    (2009.01)
H04W 36/14    (2009.01)
H04W 36/36    (2009.01)

(52) U.S. Cl.
CPC ........... H04W 36/32 (2013.01); H04W 36/14 (2013.01); H04W 36/36 (2013.01)

(58) Field of Classification Search
CPC ..... H04W 36/32; H04W 36/14; H04W 36/36; H04W 84/12; H04W 36/00837; H04M 1/725; H04M 1/72454; H04M 1/72457
See application file for complete search history.

(56) References Cited

U.S. PATENT DOCUMENTS

2010/0330952 A1*  12/2010  Yeoman ............ H04M 1/72424
                                                    455/404.2
2014/0039840 A1*   2/2014  Yuen ..................... H04W 4/029
                                                    702/189
2014/0206327 A1*   7/2014  Ziemianska ............ G06F 3/014
                                                    455/418

(Continued)

FOREIGN PATENT DOCUMENTS

CN    101350856 A    1/2009
CN    101765235 A    6/2010
CN    101924829 A    12/2010

(Continued)

Primary Examiner — Walli Z Butt
(74) Attorney, Agent, or Firm — Slater Matsil, LLP

(57) ABSTRACT

Embodiments of the present invention disclose a terminal behavior triggering method and a terminal. The method includes: detecting an environment parameter of a terminal and a terminal status parameter of the terminal; determining a target situation event based on the environment parameter and/or the terminal status parameter; and if the environment parameter meets a first preset condition, and the terminal status parameter meets a second preset condition, triggering a terminal behavior corresponding to the target situation event.

20 Claims, 10 Drawing Sheets

(56) References Cited

U.S. PATENT DOCUMENTS

2014/0369525 A1    12/2014  Lin
2015/0038156 A1*   2/2015  Kilpatrick, II .......... H04W 8/08
                                                          455/561

FOREIGN PATENT DOCUMENTS

| CN | 102158591 | A | 8/2011 |
| CN | 102299995 | A | 12/2011 |
| CN | 102447775 | A | 5/2012 |
| CN | 102647766 | A | 8/2012 |
| CN | 103152482 | A | 6/2013 |
| CN | 103581979 | A | 2/2014 |
| CN | 104052858 | A | 9/2014 |
| CN | 106161753 | A | 11/2016 |
| WO | 2016045346 | A1 | 3/2016 |

* cited by examiner

| Environment parameter | First preset condition | Situation event | Terminal status parameter | Second preset condition | Terminal behavior | Number |
|---|---|---|---|---|---|---|
| A WiFi signal is detected, and a cellular network is being used | The WiFi signal can be connected, and the cellular network is being used | A network switchover can be performed: automatically disconnect from the cellular network when WiFi is connected, or automatically enable the cellular network when WiFi is not connected | A program is running: an application name = "xx map"; and a working mode = a "driving navigation mode" | A navigation program used for driving in a terminal is being used | Continue to use the cellular network, and not to connect to the WiFi | 01 |
| A WiFi signal is detected, and a cellular network is being used | The WiFi signal can be connected, and the cellular network is being used | A network switchover can be performed: automatically disconnect from the cellular network when WiFi is connected, or automatically enable the cellular network when WiFi is not connected | A program is running: an application name = "xx music" | No navigation program used for driving in a terminal is being used | Connect to the WiFi, and disconnect from the cellular network | 02 |

FIG. 2A

| A terminal is located at a location A, and duration = 10 minutes | The location A is an area in which "home" is located | Go home | Screen-locked state, and screen-locking duration = 10 minutes | A user performs no current operation on the terminal within 10 minutes | Light up a screen, and display prompt information of "whether to adjust a desktop application icon to a home mode" | 03 |
|---|---|---|---|---|---|---|
| A terminal is located at a location B, and duration = 10 minutes | The location B is an area in which "company" is located | Go to work | Screen-locked state, and screen-locking duration = 10 minutes | A user performs no current operation on the terminal within 10 minutes | Light up a screen, and display prompt information of "whether to adjust a desktop application icon to an office mode" | 04 |

FIG. 2B

| Terminal status parameter | Second preset condition | Situation event | Environment parameter | First preset condition | Terminal behavior | Number |
|---|---|---|---|---|---|---|
| A program is running: an application name = "xx music", running duration = 2 hours, and a running time period = "1 a.m. to 3 a.m." | A music application program runs in any time period between 11 p.m. and 7 a.m., and running duration is more than one hour | Close the music application program | A terminal is located at a location A, accumulated duration = 6 hours, and a time period = "9 p.m. to 3 a.m." | The location A is an area in which "home" is located | Close the music program named "xx music" | 05 |
| A program is running: an application name = "xx music", running duration = 2 hours, and a running time period = "1 a.m. to 3 a.m." | A music application program runs in any time period between 11 p.m. and 7 a.m., and running duration is more than one hour | Close the music application program | A terminal is located at a location C, accumulated duration = 3 hours, and a time period = "12 a.m. to 3 a.m." | The location C is an unknown area | Prompt a user whether to close the music program named "xx music" | 06 |

FIG. 3

| Terminal status parameter type | Terminal status parameter description | Current running location | Number | Last operation time of a user |
|---|---|---|---|---|
| Running program status parameter | An application name = "photo"; and duration in which the application is switched to a background = 11 minutes | Running in the background | 501 | At 00:09 on May 20, 2017 |
| Running program status parameter | An application name = "xx wallet"; and duration in which the application is switched to a background = 20 minutes | Running in the background | 502 | At 00:00 on May 20, 2017 |
| Running program status parameter | An application name = "XX music"; a song name = "AAA"; and duration in which the application is switched to a background = 1 hour 10 minutes | Running in the background | 503 | At 23:10 on May 19, 2017 |
| Unlocked state parameter | Screen-locked, and screen-locking duration = 5 minutes | | 504 | At 00:15 on May 20, 2017 |

FIG. 5

| Environment parameter type | Third preset condition | Situation event | Event occurrence time | Quantity of accumulated event occurrence times | Event Number |
|---|---|---|---|---|---|
| Location parameter: A terminal is located at a location A, and duration = 10 minutes | The location A is an area in which "home" is located | A network switchover can be performed: disconnect from a cellular network when a WiFi network is connected | At 15:00 on May 20, 2017 | 100 | 601 |
| Network type parameter: A WiFi signal is detected, and a cellular network is being used | The WiFi signal can be connected, and the cellular network is being used | | | | |
| Speed parameter: A terminal speed is 3 m/s | When the terminal is in a slowly-moving state, the terminal speed is 1 m/s to 5 m/s | | | | |

FIG. 6

| Terminal status parameter | Fourth preset condition | Situation event | Event occurrence time | Quantity of accumulated event occurrence times | Event Number |
|---|---|---|---|---|---|
| Running program status parameter: an application name = "XX music"; a song name = "AAA"; a running start time: 23:10; and duration in which the application is switched to a background = 1 hour 10 minutes | A music application program runs in any time period between 11 p.m. and 7 a.m., and running duration is more than one hour | Close the music application program | At 00:15 on May 20, 2017 | 100 | 701 |
| Unlocked state parameter: screen-locked, and screen-locking duration = 5 minutes | A terminal is in a screen-locked state at 00:15 | Prompt a user to go to bed | At 00:15 on May 20, 2017 | 20 | 702 |

FIG. 7

METHOD AND APPARATUS FOR TRIGGERING TERMINAL BEHAVIOR BASED ON ENVIRONMENT AND TERMINAL STATUS PARAMETERS

CROSS-REFERENCE TO RELATED APPLICATIONS

This application is a continuation of U.S. patent application Ser. No. 16/465,789, filed on May 31, 2019, which is a national stage of International Application No. PCT/CN2017/088308, filed on Jun. 14, 2017, which claims priority to Chinese Patent Application No. 201611097005.6, filed on Dec. 2, 2016 and Chinese Patent Application No. 201710194152.3, filed on Mar. 28, 2017. All of the aforementioned patent applications are hereby incorporated by reference in their entireties.

TECHNICAL FIELD

This application relates to the field of communications technologies, and in particular, to a terminal behavior triggering method and a terminal.

BACKGROUND

With continuous development of communications technologies, terminals (such as a smartphone, a tablet computer, and a wearable device) gradually become indispensable tools in daily life, work, and study of people.

In the prior art, a terminal may detect many environment parameters associated with the terminal. When these environment parameters meet a specific preset condition, the terminal may be considered to be in a particular situation event. In this case, if a correspondence between a situation event and a terminal behavior is set, the terminal may be triggered to perform a corresponding behavior, so as to automatically trigger a terminal behavior based on an environment parameter.

For example, the terminal may first set a preset condition of "Disconnect from a cellular network if Wireless Fidelity (Wireless Fidelity, WiFi) is successfully connected, or automatically (or manually) connect to a cellular network if WiFi is not connected" in network management. In addition, the terminal detects, in real time, whether there is an environment parameter of a WiFi signal. If a WiFi signal is detected, the terminal may be considered to be in a situation event in which a network switchover can be performed. Then, the terminal may be triggered, based on the preset condition, to disconnect from the cellular network, and connect to the WiFi.

However, a correspondence between an environment parameter and a terminal behavior is excessively simple, and sometimes a terminal behavior triggered by an environment parameter affects normal use of the terminal. Consequently intelligence of the terminal is reduced. Still in the foregoing example, when a user uses navigation in driving, the terminal may automatically connect to a WiFi access point on the roadside as a location changes. However, the connection to the WiFi access point requires login. In this case, if the cellular network is automatically disabled, an intelligent terminal disconnects from the Internet. Consequently navigation becomes abnormal, normal use of a navigation function of the terminal is affected, and intelligence of the terminal is reduced.

SUMMARY

A technical problem to be resolved in embodiments of the present invention is how to make a terminal behavior triggering manner more intelligent. A terminal behavior triggering method and a terminal are provided, so as to improve intelligence of the terminal.

According to a first aspect, an embodiment of the present invention provides a terminal behavior triggering method. First, an environment parameter of a terminal and a terminal status parameter of the terminal are detected; then, a target situation event is determined based on the environment parameter and/or the terminal status parameter; and if the environment parameter meets a first preset condition, and the terminal status parameter meets a second preset condition, a terminal behavior corresponding to the target situation event is triggered.

It may be learned that in the method provided in the first aspect, both the environment parameter and the terminal status parameter are detected, so that the triggered terminal behavior better meets user expectation, thereby improving intelligence of the terminal.

In an optional implementation, before detecting the environment parameter and the terminal status parameter, the terminal may further obtain one or more environment parameters in advance, and if the one or more environment parameters meet a third preset condition, establish a correspondence between the one or more environment parameters and a situation event.

It may be learned that in this optional implementation, a correspondence between an environment parameter and a situation event may be automatically established in advance, so that the target situation event corresponding to the environment parameter can be obtained more accurately and efficiently.

In an optional implementation, before detecting the environment parameter and the terminal status parameter, the terminal may further obtain one or more terminal status parameters in advance, and if the one or more terminal status parameters meet a fourth preset condition, establish a correspondence between the one or more terminal status parameters and a situation event.

It may be learned that in this optional implementation, a correspondence between a terminal status parameter and a situation event may be automatically established in advance, so that the target situation event corresponding to the terminal status parameter can be obtained more accurately and efficiently.

In an optional implementation, the target situation event may include an accidental situation event or a non-accidental situation event; and when the target situation event is a non-accidental situation event, the triggered terminal behavior corresponding to the target situation event is a behavior performed by the terminal without prompting a user; or when the target situation event is an accidental situation event, the triggered terminal behavior corresponding to the target situation event is a behavior performed by the terminal after the terminal prompts a user and obtains user confirmation.

It may be learned that in this optional implementation, a manner of performing the behavior triggered by the terminal may be adjusted based on a type of the target situation event, so as to improve intelligence of the terminal.

In an optional implementation, that the terminal determines a target situation event based on the environment parameter and/or the terminal status parameter may be specifically: obtaining preset priorities, and selecting, based on the priorities, a parameter with a higher priority from the environment parameter and the terminal status parameter, to determine the target situation event.

It may be learned that in this optional implementation, whether the target situation event is determined by using the environment parameter or the terminal status parameter may be determined based on the priorities, so as to improve intelligence of the terminal.

In an optional implementation, that the terminal obtains preset priorities, and selects, based on the preset priorities, a parameter with a higher priority from the environment parameter and the terminal status parameter, to determine the target situation event may be specifically: if a current operation of the user on the terminal is detected, determining that a priority of a terminal status parameter that is obtained based on the current operation is higher than a priority of the environment parameter; and determining the target situation event based on the terminal status parameter that is obtained based on the current operation.

It may be learned that in this optional implementation, the priority of the terminal status parameter that is obtained based on the current operation of the user may be higher than the priority of the environment parameter by default, so as to improve intelligence of the terminal.

In an optional implementation, the environment parameter includes at least one of a location parameter, a network type parameter, a temperature parameter, a luminance parameter, a speed parameter, an air quality parameter, and a human physiological parameter.

In an optional implementation, the terminal status parameter includes a terminal status parameter triggered by a user operation; and the terminal status parameter triggered by the user operation includes at least one of a running program status parameter, an unlocked state parameter, a screen-locked state parameter, and a hardware touch status parameter.

According to a second aspect, a terminal is provided. The terminal has a function of implementing a behavior of the terminal in the first aspect or the possible implementations of the first aspect. The function may be implemented by hardware, or may be implemented by hardware by executing corresponding software. The hardware or the software includes one or more modules corresponding to the foregoing function. The module may be software and/or hardware. Based on a same inventive concept, for a problem-resolving principle and beneficial effects of the terminal, refer to the first aspect, the possible method implementations of the first aspect, and the brought beneficial effects. Therefore, for implementation of the terminal, refer to the first aspect and the possible method implementations of the first aspect. Repeated parts are not described.

According to a third aspect, a terminal is provided. The terminal includes: a memory, configured to store one or more programs; and a processor, configured to invoke the program stored in the memory, to implement the solution in the method design of the first aspect. For a problem-resolving implementation and beneficial effects of the terminal, refer to the first aspect, the possible method implementations of the first aspect, and the beneficial effects. Repeated parts are not described.

According to a fourth aspect, a computer readable storage medium is provided. The computer storage medium stores a computer program, and the computer program includes a program instruction. When the program instruction is executed by a processor, the processor performs the method in the first aspect, the possible method implementations of the first aspect, and the beneficial effects. Repeated parts are not described.

According to a fifth aspect, a computer program product is provided. When the computer program product runs on a computer, the computer performs the method in the first aspect and the possible method implementations of the first aspect.

BRIEF DESCRIPTION OF THE DRAWINGS

To describe the technical solutions in the embodiments of the present invention-more clearly, the following briefly describes the accompanying drawings required for describing the embodiments. Apparently, the accompanying drawings in the following description show some embodiments of this application, and a person of ordinary skill in the art may still derive other drawings from these accompanying drawings without creative efforts.

FIG. 3 is another schematic table of terminal behavior triggering according to an embodiment of the present invention;

FIG. 5 is a schematic table of a terminal status parameter according to an embodiment of the present invention;

FIG. 6 is a schematic table of an environment parameter according to an embodiment of the present invention;

FIG. 7 is a schematic table of another terminal status parameter according to an embodiment of the present invention;

DETAILED DESCRIPTION OF ILLUSTRATIVE EMBODIMENTS

The following describes the embodiments of the present invention with reference to the accompanying drawings in the embodiments of the present invention.

The embodiments of the present invention provide a terminal behavior triggering method and a terminal, so as to improve intelligence of the terminal. Details are described below separately.

To better understand the terminal behavior triggering method and the terminal that are provided in the embodiments of the present invention, the following first describes method embodiments of the present invention.

It should be noted that the terminal may be various types of intelligent terminals, for example, terminals that may process various types of signals, such as a smartphone, a tablet computer, a wearable device, a computer, a personal digital assistant (English: Personal Digital Assistant, PDA for short), and a mobile Internet device (English: Mobile Internet Device, MID for short).

Figures 1, 2, 2A, 2B:
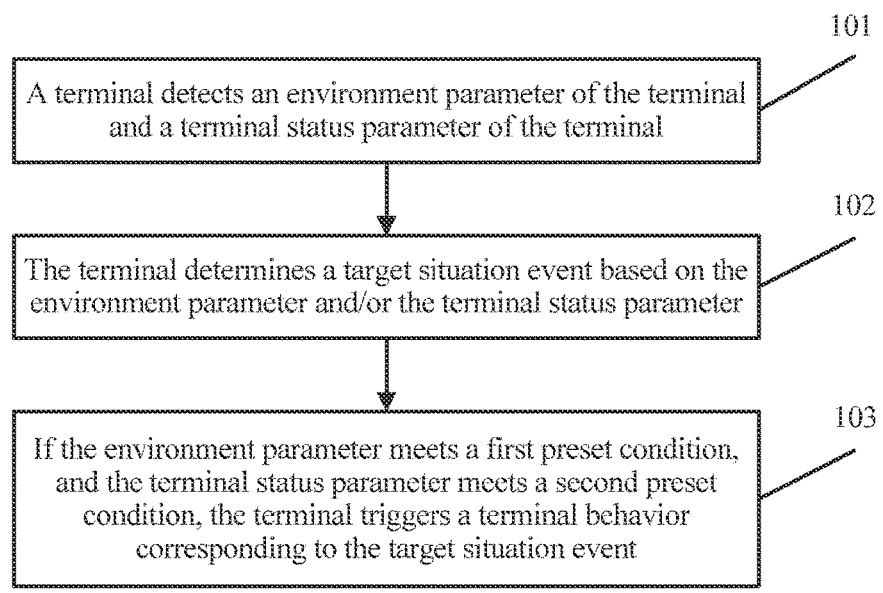
FIG. 1 is a schematic flowchart of a terminal behavior triggering method according to an embodiment of the present invention.
FIGS. 2A and 2B are schematic tables of terminal behavior triggering according to an embodiment of the present invention.
FIG. 2 indicates how the table of FIG. 2A relates to the table of FIG. 2B.

Referring to FIG. 1, FIG. 1 is a schematic flowchart of a terminal behavior triggering method according to the present invention. As shown in FIG. 1, an embodiment of the present invention includes the following steps.

101. A terminal detects an environment parameter of the terminal and a terminal status parameter of the terminal.

It should be noted that the environment parameter may be a parameter used to describe a change status of an environment in which the terminal is located.

Specifically, the environment parameter may be content directly output by a sensor after the sensor of the terminal detects the change status of the environment, for example, a location parameter, a temperature parameter, a luminance parameter, a speed parameter, a network type parameter, an air quality parameter, or a human physiological parameter (a heart rate value, a quantity of steps, or the like).

The network type parameter may specifically include a WiFi parameter, a cellular network parameter, and the like. This is not limited herein.

A specific type of environment parameter needs to be detected by using a sensor of the type. For example, if a location needs to be detected, a Global Positioning System (Global Positioning System, GPS) sensor may be used for implementation. Output of the GPS sensor may be provided by an operating system or specially-encapsulated functions, and current longitude and latitude coordinates of the terminal can be obtained by calling these functions.

Alternatively, the terminal performs semantic analysis on content directly output by a sensor, to obtain content, and the obtained content may be used as the environment parameter. For example, the terminal detects ambient air quality, to obtain content about whether it is appropriate to go outside today, and the obtained content may be used as the environment parameter; or the terminal detects a heart rate of a human body, to obtain content about whether a user is in a motion state, and the obtained content may be used as the environment parameter.

Alternatively, the environment parameter may be a parameter that is obtained by a sensor by accumulating information of different time and then performing comprehensive determining based on the accumulated information. For example, a location sensor detects that a user is located at a location A from 11 p.m. to 7 a.m. and at a location B from 9 a.m. to 5 p.m. for at least five days in a week. In this case, it may be comprehensively determined that the location A is home, and the location B is a company.

It should be further noted that the sensor may be built in the terminal, or may be located on another device, and send collected data to the terminal by using a data communication mechanism. For example, the terminal may invoke, as the environment parameter, data that is obtained by a wearable device (such as a smartwatch) that establishes a wireless communication connection to the terminal.

It should be further noted that the sensor may be a hardware-type sensor, or may be software or a service. For example, information provided by the software may also be considered as the environment parameter, for example, a message sent by a friend is received in social application software, or a post is replied.

It should be further noted that the terminal status parameter includes a terminal status parameter triggered by a user operation. The terminal status parameter triggered by the user operation includes at least one of a running program status parameter, an unlocked state parameter, a screen-locked state parameter, and a hardware touch status parameter.

The running program status parameter may be a parameter in which a status of an application changes when the user performs an operation on the application on the terminal. For example, the user performs an operation on a music application program named "xx", and the music application program starts to play a song named "AAA". In this case, the running program status parameter may be specifically "an application name="xx music", and a song name="AAA"".

Alternatively, the running program status parameter may be a parameter in which a status of a system program changes when the user performs a touch operation (the touch operation may also be recorded by the terminal as the hardware touch status parameter) on human-computer interaction hardware on the terminal. For example, the user touches a button on the terminal that is used for increasing volume. In this case, the hardware touch status parameter may be "The button used for increasing the volume is touched". Further, due to the hardware touch status parameter, a status of the system program is changed to a state of increasing the volume of the terminal, and the status of the system program may further be recorded by the terminal as the running program status parameter.

In a specific implementation, the terminal status parameter may be detected by using the human-computer interaction hardware (for example, a touchscreen, a keyboard, or a microphone) and corresponding software, and one or more corresponding terminal status parameters are obtained. For example, after the user runs a particular application by using the touchscreen, the operating system can learn that the specific application is running, and can also learn that the terminal is currently in a screen-locked state, an unlocked state, or the like.

102. The terminal determines a target situation event based on the environment parameter and/or the terminal status parameter.

It should be noted that there may be a plurality of situation events. The target situation event may be an event that is corresponding to the environment parameter and that is selected from the plurality of situation events.

It should be further noted that the terminal may determine the target situation event based on the environment parameter, or may determine the target situation event based on the terminal status parameter, or may determine the target situation event based on both the terminal status parameter and the environment parameter.

When determining the target situation event based on the environment parameter, specifically, the terminal may determine the target situation event only when the environment parameter meets a first preset condition. Then, the terminal may further detect the terminal status parameter, and determine whether the terminal status parameter meets the second preset condition.

For example, referring to FIG. 2A, in a row numbered 01, the environment parameter indicates that the terminal currently finds a WiFi signal that can be connected, and a cellular network is being used. Therefore, the terminal may determine that the environment parameter meets a first preset condition of "The WiFi signal can be connected, and the cellular network is being used", and the terminal may determine, based on the first preset condition, that the target situation event is "A network switchover can be performed: automatically disconnect from the cellular network when WiFi is connected, or automatically enable the cellular network when WiFi is not connected". Then, the terminal may further detect the terminal status parameter, and determine whether the terminal status parameter meets the second preset condition.

When determining the target situation event based on the terminal status parameter, specifically, the terminal may determine the target situation event only when the terminal status parameter meets the second preset condition. Then, the terminal may further detect the environment parameter, and determine whether the environment parameter meets the first preset condition.

For example, the second preset condition is specifically "A music application program runs in any time period between 11 p.m. and 7 a.m., and running duration is more than one hour". As shown in FIG. 3, in a row numbered 05, the terminal status parameter indicates that the terminal runs a music application program from 1 a.m. to 3 a.m., and running duration is two hours. Therefore, the terminal may determine that the terminal status parameter meets the second preset condition of "A music application program runs in any time period between 11 p.m. and 7 a.m., and running duration is more than one hour", and the terminal may determine, based on the second preset condition, that the target situation event is "Close the music application program".

When determining the target situation event based on both the terminal status parameter and the environment parameter, specifically, the terminal may determine the target situation event only when the terminal status parameter meets the second preset condition, and the environment parameter meets the first preset condition.

For example, as shown in FIG. 2A, in the row numbered 01, the first preset condition may be specifically "The WiFi signal can be connected, and the cellular network is being used", and the second preset condition may be specifically "Navigation used for driving in a terminal is being used". If the terminal detects that the environment parameter meets the first preset condition of "The WiFi signal can be connected, and the cellular network is being used", and the terminal status parameter meets the second preset condition of "Navigation used for driving in a terminal is being used", the terminal may determine that the target situation event is "A network switchover can be performed: automatically disconnect from the cellular network when WiFi is connected, or automatically enable the cellular network when WiFi is not connected".

It should be further noted that when the terminal determines the target situation event based on both the terminal status parameter and the environment parameter, the terminal has determined the target situation event based on the first preset condition and the second preset condition (in other words, the terminal status parameter and the environment parameter respectively meet the second preset condition and the first preset condition before the target situation event is determined). Therefore, when triggering a corresponding terminal behavior, the terminal may not further determine whether the terminal status parameter and the environment parameter respectively meet the second preset condition and the first preset condition, but may directly trigger the corresponding terminal behavior after the target situation event is determined.

Optionally, the terminal may first obtain preset priorities, and then select, based on the priorities, a parameter with a higher priority from the environment parameter and the terminal status parameter, to determine the target situation event.

In some feasible implementations, if the terminal detects that the user currently does not perform any operation on the terminal, the terminal may determine that a priority of the environment parameter is higher than a priority of the terminal status parameter, and the terminal may preferentially determine the target situation event by using the environment parameter.

Optionally, if the terminal detects a current operation of the user on the terminal, the terminal may determine that a priority of a terminal status parameter that is obtained based on the current operation is higher than a priority of the environment parameter, and the terminal may preferentially determine the target situation event based on the terminal status parameter that is obtained based on the current operation.

103. If the environment parameter meets a first preset condition, and the terminal status parameter meets a second preset condition, the terminal triggers a terminal behavior corresponding to the target situation event.

It should be noted that the first preset condition and the second preset condition may vary in specific condition content because the environment parameter and the terminal status parameter respective corresponding to the first preset condition and the second preset condition are different.

It should be further noted that if the target situation event is determined based on the environment parameter, specifically, the target situation event may be determined based on that the environment parameter meets the first preset condition. In other words, the environment parameter meets the first preset condition before the target situation event is determined based on the environment parameter. Then the terminal determines whether the terminal status parameter meets the second preset condition, and if the terminal status parameter meets the second preset condition, triggers the terminal behavior corresponding to the target situation event.

It should be further noted that the terminal behavior may be a behavior that is performed by the terminal based on a preset behavior rule when the environment parameter and the terminal status parameter meet respective corresponding conditions. For example, as shown in the row numbered oi in FIG. 2A, the terminal may preset a behavior rule as "When a user is driving, the terminal does not disconnect from the cellular network even if a WiFi signal can be connected", and then preset, based on the behavior rule, the first preset condition of "The WiFi signal can be connected, and the cellular network is being used" and the second preset condition of "A navigation program used for driving in a terminal is being used". If the environment parameter meets the first preset condition, and the terminal status parameter meets the second preset condition, the terminal may determine, based on the preset behavior rule, to perform a terminal behavior of "Continue to use the cellular network, and not to connect to the WiFi".

In an embodiment, as shown in FIG. 2A, in the row numbered 01, the first preset condition may be specifically "The WiFi signal can be connected, and the cellular network is being used". If the terminal detects that the environment parameter meets the first preset condition of "The WiFi signal can be connected, and the cellular network is being used", the terminal may determine, based on the first preset condition, that the target situation event is "A network switchover can be performed: automatically disconnect from the cellular network when WiFi is connected, or automatically enable the cellular network when WiFi is not connected", and then further detect the terminal status parameter to find out whether a navigation program runs. If the terminal detects that the navigation program runs, and a "driving navigation mode" is executed, the terminal may determine that the terminal status parameter meets the second preset condition of "Navigation used for driving in a terminal is being used", and may further determine that the terminal behavior corresponding to the target situation event is "Continue to use the cellular network, and not to connect to the WiFi".

In some feasible implementations, the terminal may alternatively determine, together with the terminal status parameter and the environment parameter, whether the terminal status parameter meets the second preset condition. For example, in the foregoing example, the terminal detects the terminal status parameter to find out whether a navigation program runs. If the terminal detects that the navigation program runs, and determines, based on a speed sensor, that sensor data meets a driving state, the terminal may determine that the terminal status parameter meets the second preset condition of "Navigation used for driving in a terminal is being used", and may determine that the terminal behavior corresponding to the target situation event is "Continue to use the cellular network, and not to connect to the WiFi".

For another example, as shown in FIG. 2A, in a row numbered 02, the first preset condition may be specifically "The WiFi signal can be connected, and the cellular network is being used". If the terminal detects that the environment parameter meets the first preset condition of "The WiFi signal can be connected, and the cellular network is being used", the terminal may determine, based on the first preset condition, that the target situation event is "A network switchover can be performed: automatically disconnect from the cellular network when WiFi is connected, or automatically enable the cellular network when WiFi is not connected", and then further detect the terminal status parameter to find out whether a navigation program runs. If the terminal detects that a music program runs, the terminal may determine that the terminal status parameter meets a second preset condition of "No navigation used for driving in a terminal is being used", and may further determine that the terminal behavior corresponding to the target situation event is "Connect to the WiFi, and disconnect from the cellular network".

In an embodiment, as shown in FIG. 2B, in a row numbered 03, the first preset condition may be specifically "The location A is an area in which "home" is located". If the environment parameter indicates that the terminal is located at the location A, and meets the first preset condition of "The location A is an area in which 'home' is located", the terminal may determine, based on the first preset condition, that the target situation event is "Go home", and then further detect the terminal status parameter. If it is detected that the terminal is currently in a screen-locked state, and screen-locking duration is 10 minutes, the terminal may determine that the terminal status parameter meets a second preset condition of "A user performs no current operation on the terminal within 10 minutes", and may further determine that the terminal behavior corresponding to the target situation event is "Light up a screen, and display prompt information of 'whether to adjust a desktop application icon to a home mode'".

In an embodiment, as shown in FIG. 2B, in a row numbered 04, the first preset condition may be specifically "The location B is an area in which 'company' is located". If the environment parameter indicates that the terminal is located at the location B, and meets the first preset condition of "The location B is an area in which 'company' is located", the terminal may determine, based on the first preset condition, that the target situation event is "Go to work", and then further detect the terminal status parameter. If it is detected that the terminal is currently in a screen-locked state, and screen-locking duration is 10 minutes, the terminal may determine that the terminal status parameter meets a second preset condition of "A user performs no current operation on the terminal within 10 minutes", and may further determine that the terminal behavior corresponding to the target situation event is "Light up a screen, and display prompt information of 'whether to adjust a desktop application icon to an office mode'".

Similarly, if the target situation event is determined based on the terminal status parameter, the target situation event may be determined based on that the terminal status parameter meets the second preset condition. Then, the terminal determines whether the environment parameter meets the first preset condition, and if the environment parameter meets the first preset condition, triggers the terminal behavior corresponding to the target situation event.

In an embodiment, as shown in FIG. 3, in the row numbered 05, the second preset condition may be specifically "A music application program runs in any time period between 11 p.m. and 7 a.m., and running duration is more than one hour". If the terminal status parameter indicates that the terminal is running a music program named "xx music", the music application program runs from 1 a.m. to 3 a.m., and running duration is two hours, and the terminal status parameter meets the second preset condition of "A music application program runs in any time period between u p.m. and 7 a.m., and running duration is more than one hour", the terminal may determine, based on the second preset condition, that the target situation event is "Close the music application program". Then, the terminal further detects the environment parameter. If it is detected that the terminal is currently located at the location A, a time period ranges from 9 p.m. to 3 a.m., and duration is six hours, the terminal may determine that the terminal status parameter meets the first preset condition of "The location A is an area in which "home" is located", and may further determine that the terminal behavior corresponding to the target situation event is to close the music program named "xx music".

In an embodiment, as shown in FIG. 3, in a row numbered 06, the second preset condition may be specifically "A music application program runs in any time period between 11 p.m. and 7 a.m., and running duration is more than one hour". If the terminal status parameter indicates that the terminal is running a music program named "xx music", the music application program runs from 1 a.m. to 3 a.m., and running duration is two hours, and the terminal status parameter meets the second preset condition of "A music application program runs in any time period between 11 p.m. and 7 a.m., and running duration is more than one hour", the terminal may determine, based on the second preset condition, that the target situation event is "Close the music application program". Then, the terminal further detects the environment parameter. If it is detected that the terminal is currently located at a location C, a time period ranges from 12 a.m. to 3 a.m., and duration is three hours, the terminal may determine that the terminal status parameter meets a first preset condition of "The location A is an area in which "home" is located", and may further determine that the terminal behavior corresponding to the target situation event is "Prompt a user whether to close the music program named "xx music"".

It should be further noted that the environment parameter and the terminal status parameter may be independently detected by the terminal. In other words, the terminal records both the environment parameter and the terminal status parameter, and determines whether the other parameter meets a condition regardless of which parameter is used to trigger the terminal behavior.

In some feasible embodiments, when triggering a corresponding behavior, the terminal may not need to perform deep semantic analysis on the environment parameter and the terminal status parameter, but directly trigger the corresponding behavior based on a condition. For example, current longitude and latitude coordinates of the terminal that are obtained by a GPS sensor are 23.67 degrees north latitude and 104.06 degrees east longitude, and this is the same as a condition preset by the terminal for triggering a behavior of "Adjust a desktop application icon to a home mode", so that the terminal may be triggered to perform the behavior of "Adjust a desktop application icon to a home mode".

In this embodiment of the present invention, the terminal first detects the environment parameter and the terminal status parameter of the terminal, and then determines the target situation event based on the environment parameter and/or the terminal status parameter. If the environment parameter meets the first preset condition, and the terminal status parameter meets the second preset condition, the terminal triggers the terminal behavior corresponding to the target situation event. Both the environment parameter and the terminal status parameter are detected, so that the triggered terminal behavior better meets user expectation, thereby improving intelligence of the terminal.

Figure 4:
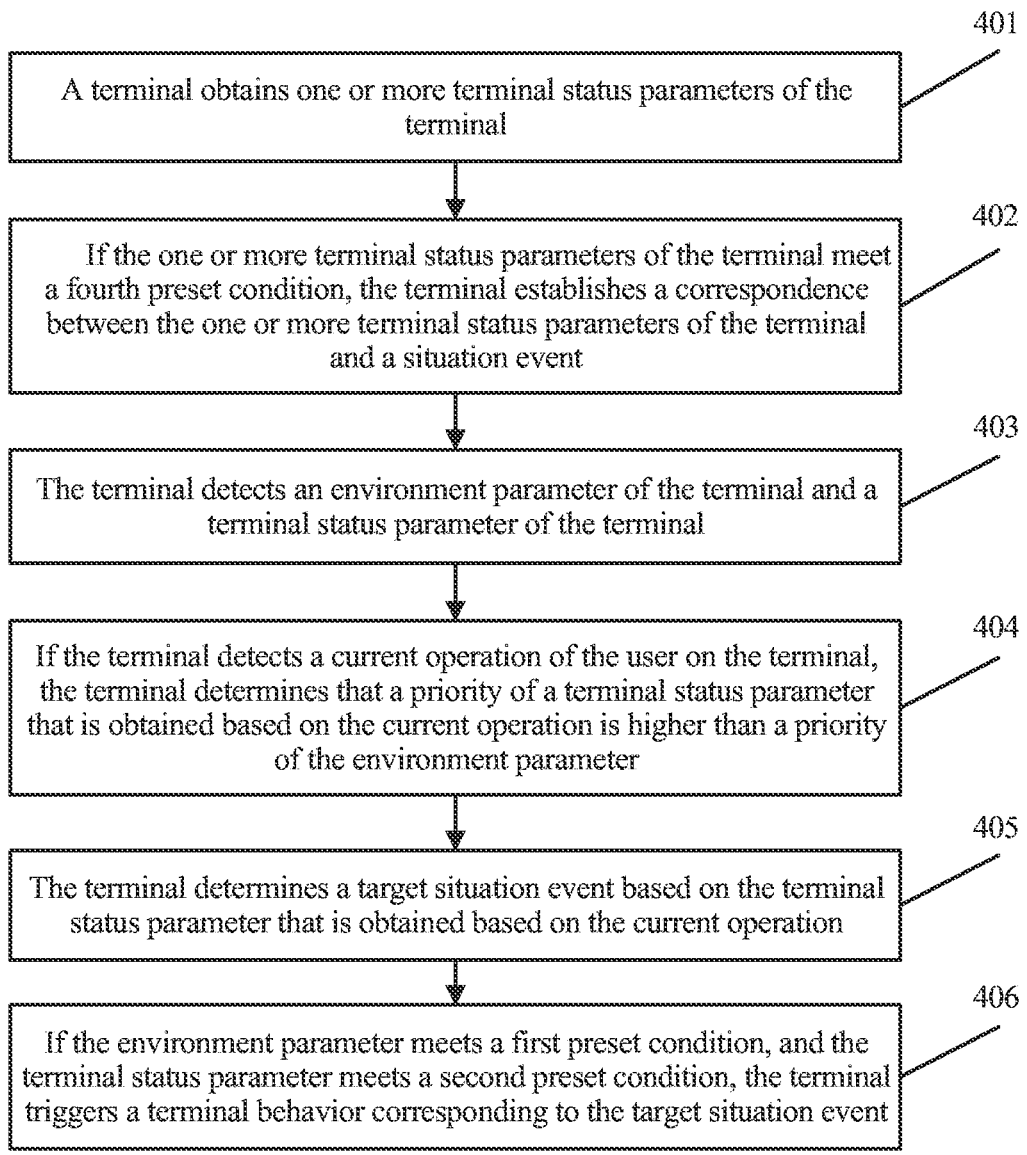
FIG. 4 is a schematic flowchart of another terminal behavior triggering method according to an embodiment of the present invention.

Referring to FIG. 4, FIG. 4 shows a terminal behavior triggering method according to the present invention. As shown in FIG. 4, an embodiment of the present invention includes the following steps.

401. A terminal obtains one or more terminal status parameters of the terminal.

It should be noted that the terminal status parameter includes a terminal status parameter triggered by a user operation. The terminal status parameter triggered by the user operation includes at least one of a running program status parameter, an unlocked state parameter, a screen-locked state parameter, and a hardware touch status parameter.

In a specific implementation, an operation performed by the user on the terminal, for example, running an application program, unlocking a screen, locking a screen, or the like, may be detected by an interface encapsulated by an operating system of the terminal, and then the terminal may invoke, based on a requirement, the interface to obtain status information of the terminal, namely, the terminal status parameter.

In an embodiment, as shown in FIG. 5, FIG. 5 is a schematic table of a terminal status parameter according to an embodiment of the present invention. The schematic table shown in FIG. 5 may be a table of terminal statuses recorded by the terminal at 17:20 Beijing time on May 20, 2017. It may be learned that the terminal status parameter shown in FIG. 5 may specifically include a plurality of types of parameters such as a status parameter type, a status parameter description, a current running location, a number, and last operation time of the user. Specifically, it may be learned from the schematic table shown in FIG. 5 that a program currently running in a foreground on the terminal is "xx map", programs running in a background are "xx wallet" and "xx music", and the terminal is in an unlocked state.

402. If the one or more terminal status parameters of the terminal meet a fourth preset condition, the terminal establishes a correspondence between the one or more terminal status parameters of the terminal and a situation event.

In a specific implementation, after recording the schematic table of the terminal statuses, the terminal may determine whether a terminal status parameter in the schematic table meets the fourth preset condition, and if a terminal status parameter in the schematic table meets the fourth preset condition, establish a correspondence between the one or more terminal status parameters and a situation event.

For example, as shown in FIG. 5, content in each of rows numbered 501 to 504 is a terminal status parameter recorded by the terminal at 00:20 on May 20, 2017. It may be learned that the terminal may record each terminal status parameter in real time, and establish a data table. The data table may include list entries such as a "terminal status parameter type", a "terminal status parameter description", a "current running location", a "number", and "last operation time of a user", and then the terminal may record content corresponding to each terminal status parameter in a corresponding list entry.

The terminal may determine, based on the data table at a same moment, one or more target situation events. This is not limited in this embodiment of the present invention.

It should be noted that the fourth preset condition is used to determine a correspondence between a terminal status parameter and a situation event. In some particular cases, the fourth preset condition may be the same as the second preset condition. For example, when the target situation event is determined based on the terminal status parameter, the fourth preset condition may be the same as the second preset condition.

For example, as shown in FIG. 7, when the terminal determines the target situation event based on the terminal status parameter, a terminal status parameter in a row numbered 701 indicates that the terminal runs a music application program at 23:10, and duration is 1 hour 10 minutes, and the terminal status parameter meets a fourth preset condition of "A music application program runs in any time period between 11 p.m. and 7 a.m., and running duration is more than one hour". The fourth preset condition is the same as a second preset condition in rows numbered 01 and 02 in FIG. 3, so that the terminal may determine, based on the fourth preset condition, that a situation event corresponding to the terminal status parameter is "Close the music application program".

It should be further noted that when the terminal determines the target situation event based on an environment parameter, the fourth preset condition may be different from the second preset condition.

For another example, when the target situation event is determined based on the environment parameter, with reference to a row numbered 03 in FIG. 2B, if the environment parameter indicates that the terminal is located at a location A, and meets a first preset condition of "The location A is an area in which 'home' is located", the terminal may determine, based on the first preset condition, that the target situation event is "Go home". Then, the terminal further detects the terminal status parameter (in this case, the terminal status parameter is used to determine whether the terminal needs to perform a corresponding terminal behavior). Then, with reference to the terminal status parameter that is in the row numbered 701 in FIG. 7 and that can indicate that the terminal is currently in a screen-locked state and screen-locking duration is five minutes, the terminal may determine that the terminal status parameter does not meet a second preset condition of "A user performs no current operation on the terminal within 10 minutes", but meets a fourth preset condition of "A terminal is in a screen-locked state at 00:15". In this case, if the user sets, in advance, to send a bedtime notification at 00:15, the terminal may determine, based on the fourth preset condition, that another target situation event is "Prompt a user to go to bed", but does not perform a terminal behavior of "Light up a screen, and display prompt information of 'whether to adjust a desktop application icon to a home mode'" that is performed only when the second preset condition is met.

Optionally, the terminal may further obtain one or more environment parameters. If the one or more environment parameters meet a third preset condition, a correspondence between the one or more environment parameters and a situation event is established.

Similarly, the third preset condition is used to determine a correspondence between an environment parameter and a situation event. In some particular cases, the third preset condition may be the same as the first preset condition. For example, when the target situation event is determined based on the environment parameter, the third preset condition may be the same as the first preset condition; and when the terminal determines the target situation event based on the terminal status parameter, the third preset condition may be different from the first preset condition.

For example, when the target situation event is determined based on the environment parameter, if the terminal detects that the environment parameter is "A WiFi signal is detected, and a cellular network is being used", and meets a third preset condition of "The WiFi signal can be connected, and the cellular network is being used", the third preset condition is the same as a first preset condition in a row numbered oi in FIG. 2A, and the terminal may determine, based on the third preset condition, a corresponding target situation event is "A network switchover can be performed: automatically disconnect from the cellular network when WiFi is connected, or automatically enable the cellular network when WiFi is not connected".

For another example, as shown in FIG. 7, when the target situation event is determined based on the terminal status parameter, the terminal determines, based on the terminal status parameter corresponding to the event number 701, that a situation event is "Close the music application program", and then the terminal may further detect the environment parameter (in this case, the environment parameter is used to determine whether the terminal needs to perform a corresponding terminal behavior). If the environment parameter is "A terminal is located at a location B, accumulated duration=6 hours, and a time period="9 p.m. to 1 a.m."", a location A does not exist in the environment parameter; therefore, the environment parameter does not meet the first preset condition of "The location A is an area in which "home" is located", but meets a third preset condition of "The location B is an area in which "company" is located". In this case, the terminal may determine, based on the third preset condition, that another target situation event is "Go to work", but the terminal does not perform a terminal behavior of "Close a music program named "xx music"" that is performed only when the first preset condition is met.

Optionally, the target situation event may include an accidental situation event or a non-accidental situation event. If the target situation event is a non-accidental situation event, the triggered terminal behavior corresponding to the target situation event is a behavior performed by the terminal without prompting a user. Alternatively, if the target situation event is an accidental situation event, the triggered terminal behavior corresponding to the target situation event is a behavior performed by the terminal after the terminal prompts a user and obtains user confirmation.

It should be noted that the terminal may further determine, based on a quantity of accumulated event occurrence times, whether the target situation event is an accidental situation event or a non-accidental situation event. If the target situation event is an accidental situation event, the terminal behavior corresponding to the target situation event may be the behavior performed by the terminal without prompting the user. If the target situation event is an accidental situation event, the terminal behavior corresponding to the target situation event may be the behavior performed by the terminal after the terminal prompts the user and obtains the user confirmation.

In an embodiment, as shown in FIG. 6, in a situation event corresponding to an event number 601, a quantity of accumulated event occurrence times counted by the terminal is 100, and is greater than 50 (50 is a lowest threshold of the non-accidental situation event). Therefore, when a terminal behavior corresponding to the non-accidental situation event is triggered, the terminal may directly perform the corresponding terminal behavior without prompting the user.

In an embodiment, as shown in FIG. 7, in a situation event corresponding to an event number 701, a quantity of accumulated event occurrence times counted by the terminal is 100, and is greater than 50 (50 is a lowest threshold of the non-accidental situation event). Therefore, when a terminal behavior corresponding to the non-accidental situation event is triggered, the terminal may directly perform the corresponding terminal behavior without prompting the user. In a situation event corresponding to an event number 702, a quantity of accumulated event occurrence times counted by the terminal is 20, and is less than 50 (50 is a highest threshold of the accidental situation event). Therefore, when a terminal behavior corresponding to the accidental situation event is triggered, the terminal needs to prompt the user, and perform the corresponding terminal behavior after obtaining user confirmation.

403. The terminal detects an environment parameter of the terminal and a terminal status parameter of the terminal.

404. If the terminal detects a current operation of a user on the terminal, the terminal determines that a priority of a terminal status parameter that is obtained based on the current operation is higher than a priority of the environment parameter.

Optionally, the terminal obtains preset priorities, and then selects, based on the priorities, a parameter with a higher priority from the environment parameter and the terminal status parameter, to determine the target situation event.

In an embodiment, a priority of the environment parameter is higher than a priority of the terminal status parameter, and the terminal may preferentially determine the target situation event based on the environment parameter. The third preset condition may be "The WiFi signal can be connected, and the cellular network is being used". Alternatively, the third preset condition may be a condition corresponding to each of a plurality of environment parameters. In other words, the third preset condition may be a condition separately preset based on a type of the environment parameter. A situation event may be determined only when each environment parameter meets a third preset condition corresponding to the environment parameter.

For example, as shown in FIG. 6, the terminal detects, at 15:00 on May 20, 2017, that a network type parameter is "A WiFi signal is detected, and the cellular network is being used" and meets the third preset condition of "The WiFi signal can be connected, and the cellular network is being used", a location parameter is "A terminal is located at a location A, and duration=10 minutes" and meets a third preset condition of "The location A is an area in which "home" is located", and a speed parameter is "A terminal speed is 3 m/s" and meets a third preset condition of "When the terminal is in a slowly-moving state, the terminal speed is 1 m/s to 5 m/s". Therefore, the terminal may determine, based on the environment parameters that meet the respective corresponding third preset conditions, that a corresponding situation event is "A network switchover can be performed: disconnect from a cellular network when the WiFi network is connected", and then determine, with reference to a user status parameter, a terminal behavior to be triggered by the terminal.

Optionally, that the terminal obtains preset priorities, and then selects, based on the priorities, a parameter with a higher priority from the environment parameter and the terminal status parameter, to determine the target situation event may be implemented by using step 404 and step 405.

In a specific implementation, if the terminal detects that the user is performing a current operation on the terminal, the terminal may determine that a priority of a terminal status parameter that is obtained based on the current operation performed by the user is higher than a priority of the environment parameter.

In an embodiment, if the terminal detects, through a touchscreen, that the user is disabling the WiFi and enabling the cellular network on the terminal, the obtained terminal status parameter may be "A setting program is running, and the user is disabling the WiFi and enabling the cellular network". In this case, the terminal may preferentially consider the obtained terminal status parameter even if the environment parameter indicates that there is a WiFi network that can be connected.

405. The terminal determines the target situation event based on the terminal status parameter that is obtained based on the current operation.

In an embodiment, the terminal may determine that the target situation event is "Disable the WiFi, and enable the cellular network" based on the terminal status parameter of "A setting program is running, and the user is disabling the WiFi and enabling the cellular network" that is obtained based on the current operation.

406. If the environment parameter meets a first preset condition, and the terminal status parameter meets a second preset condition, the terminal triggers a terminal behavior corresponding to the target situation event.

In some feasible embodiments, before the target situation event is determined based on the terminal status parameter that is obtained based on the current operation of the user, the terminal may consider that the current second preset condition is "The user is performing a current operation". In other words, the terminal status parameter meets the second preset condition. Further, the terminal may not consider the environment parameter. Alternatively, when a priority status parameter is higher than a priority of the environment parameter, the first preset condition is empty by default. In other words, any environment parameter may be considered, by default, as meeting the first preset condition. Further, the terminal may trigger the terminal behavior corresponding to the target situation event.

In this embodiment of the present invention, the terminal may pre-establish the correspondence between an environment parameter and a situation event and the correspondence between a terminal status parameter and a situation event, and then detect the environment parameter and the terminal status parameter. In addition, in this case, when detecting that the user is performing the current operation on the terminal, the terminal determines the target situation event based on the terminal status parameter that is obtained based on the current operation, and triggers the terminal behavior corresponding to the target situation event. The correspondence is pre-established, so that the target situation event is determined more accurately and effectively. In addition, the priorities of the terminal status parameter and the environment parameter are set, and the priority of the terminal status parameter that is obtained based on the current operation of the user is higher than the priority of the environment parameter by default, so that the triggered terminal behavior better meets user expectation, thereby improving intelligence of the terminal.

Figure 8:
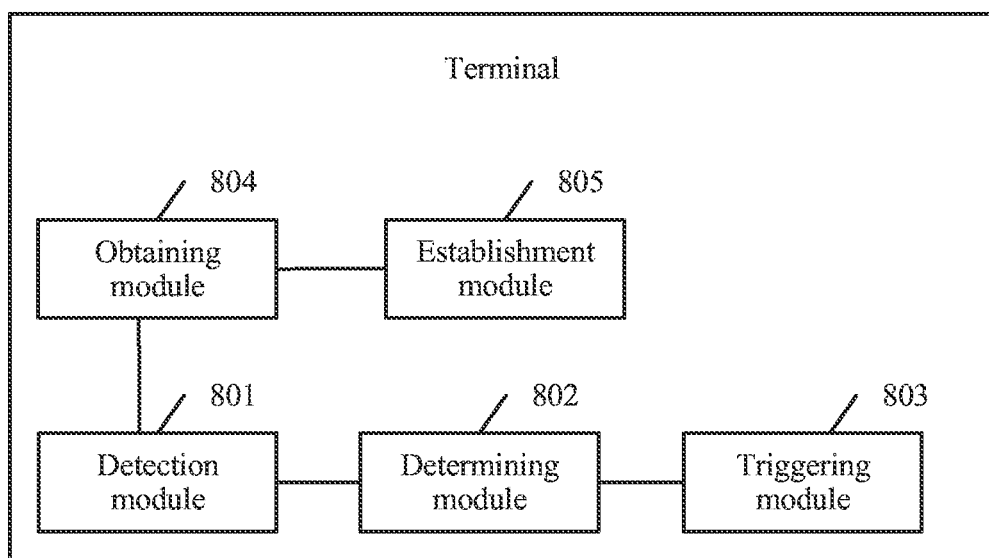
FIG. 8 is a schematic structural diagram of a terminal according to an embodiment of the present invention.

Referring to FIG. 8, FIG. 8 is a schematic structural diagram of a terminal according to an embodiment of the present invention. The terminal described in this embodiment includes a detection module 801, a determining module 802, and a triggering module 803.

The detection module 801 is configured to detect an environment parameter of the terminal and a terminal status parameter of the terminal.

Optionally, the environment parameter includes at least one of a location parameter, a network type parameter, a temperature parameter, a luminance parameter, a speed parameter, an air quality parameter, and a human physiological parameter.

Optionally, the terminal status parameter includes a terminal status parameter triggered by a user operation. The terminal status parameter triggered by the user operation includes at least one of a running program status parameter, an unlocked state parameter, a screen-locked state parameter, and a hardware touch status parameter.

The determining module 802 is configured to determine a target situation event based on the environment parameter and/or the terminal status parameter.

Optionally, the target situation event may include an accidental situation event or a non-accidental situation event. If the target situation event is a non-accidental situation event, the triggered terminal behavior corresponding to the target situation event is a behavior performed by the terminal without prompting a user. Alternatively, if the target situation event is an accidental situation event, the triggered terminal behavior corresponding to the target situation event is a behavior performed by the terminal after the terminal prompts a user and obtains user confirmation.

The triggering module 803 is configured to: if the environment parameter meets a first preset condition, and the terminal status parameter meets a second preset condition, trigger a terminal behavior corresponding to the target situation event.

Optionally, the terminal further includes an obtaining module 8o4, configured to obtain one or more environment parameters; and an establishment module 805, configured to: if the one or more environment parameters meet a third preset condition, establish a correspondence between the one or more environment parameters and a situation event.

Optionally, the obtaining module 804 is further configured to obtain one or more terminal status parameters of the terminal.

The establishment module 805 is further configured to: if the one or more terminal status parameters of the terminal meet a fourth preset condition, establish a correspondence between the one or more terminal status parameters of the terminal and a situation event.

Optionally, the obtaining module 804 is specifically configured to: obtain preset priorities, and select, based on the priorities, a parameter with a higher priority from the environment parameter and the terminal status parameter, to determine the target situation event.

Optionally, the obtaining module 804 is specifically configured to: if a current operation of the user on the terminal is detected, determine that a priority of a terminal status parameter that is obtained based on the current operation is higher than a priority of the environment parameter, and determine the target situation event based on the terminal status parameter that is obtained based on the current operation.

In this embodiment of the present invention, the terminal first detects the environment parameter and the status parameter, and then determines the target situation event based on the environment parameter and/or the terminal status parameter. If the environment parameter meets the first preset condition, and the terminal status parameter meets the second preset condition, the terminal triggers the terminal behavior corresponding to the target situation event. Both the environment parameter and the terminal status parameter are detected, so that the triggered terminal behavior better meets user expectation, thereby improving intelligence of the terminal.

Figure 9:
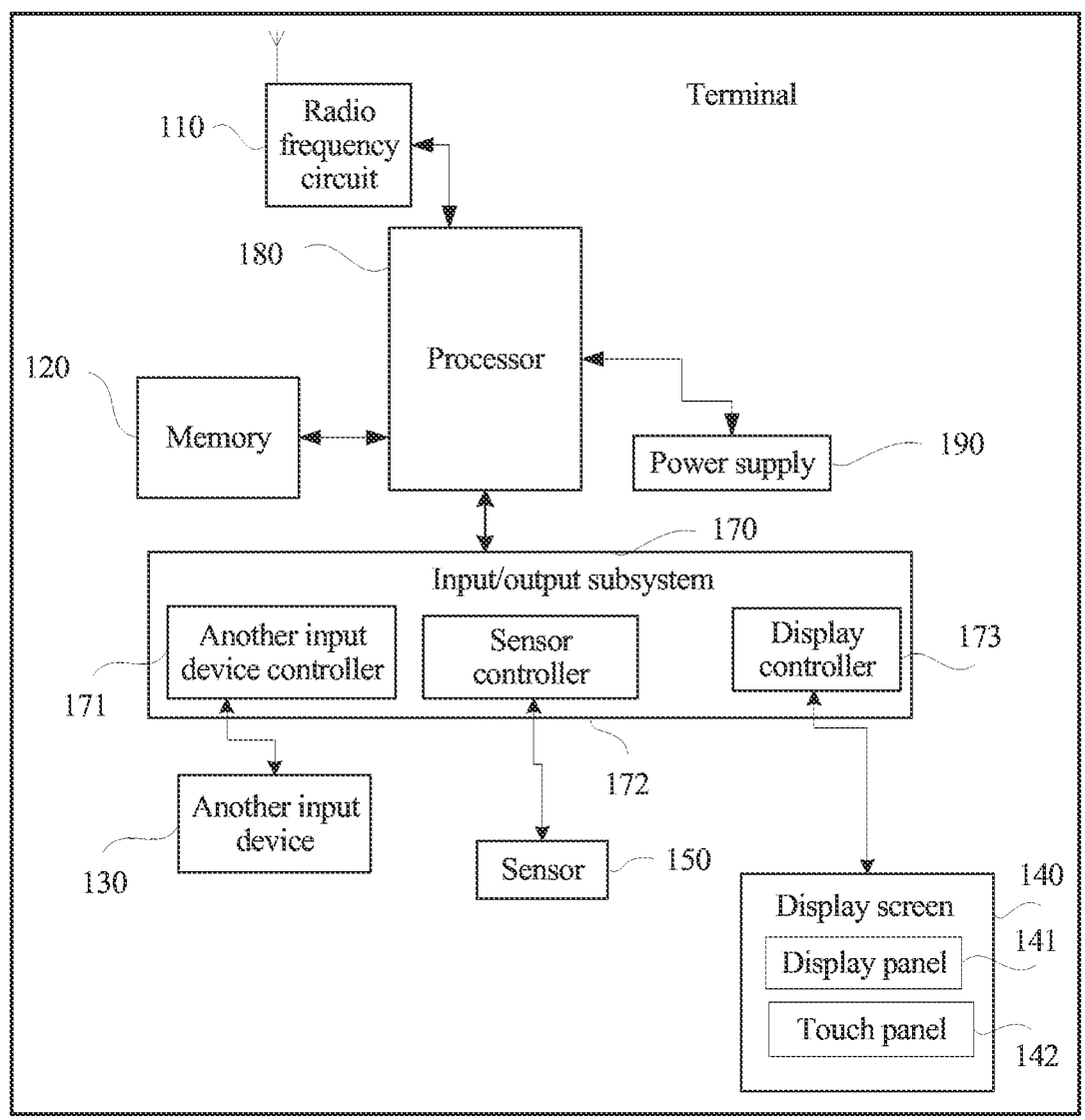
FIG. 9 is a schematic structural diagram of another terminal according to an embodiment of the present invention.

Referring to FIG. 9, FIG. 9 is a schematic structural diagram of another terminal according to an embodiment of the present invention. The terminal described in this embodiment includes components such as a radio frequency (Radio Frequency, RF) circuit 110, a memory 120, another input device 130, a display screen 140, a sensor 150, an input/output subsystem 170, a processor 190, and a power supply 190. A person skilled in the art may understand that a structure of the terminal shown in FIG. 9 constitutes no limitation on the terminal. The terminal may include more or fewer components than those shown in the figure, or combine some parts, or split some parts, or have different component arrangements. A person skilled in the art may understand that the display screen 140 is a user interface (UI, User Interface), and the terminal may include more or fewer user interfaces than that shown in the figure.

The following describes the components of the terminal in detail with reference to FIG. 9.

The radio frequency circuit 110 may be configured to: receive and send a signal in an information receiving or sending process or a call process; particularly, after receiving downlink information of a base station, send the downlink information to the processor 180 for processing; and send designed uplink data to the base station. Generally, the radio frequency circuit includes but is not limited to an antenna, at least one amplifier, a transceiver, a coupler, an LNA (Low Noise Amplifier, low noise amplifier), a duplexer, and the like. In addition, the radio frequency circuit 110 may further communicate with a network and another device through wireless communication. The wireless communication may use any communications standard or protocol that includes but is not limited to: a GSM (Global System of Mobile Communication, Global System for Mobile Communications), a GPRS (General Packet Radio Service, general packet radio service), CDMA (Code Division Multiple Access, Code Division Multiple Access), WCDMA (Wideband Code Division Multiple Access, Wideband Code Division Multiple Access), LTE (Long Term Evolution, Long Term Evolution), an email, an SMS (Short Messaging Service, short message service), and the like.

The memory 120 may be configured to store a software program and a module, and the processor 180 executes various functional applications of the terminal 1 and data processing by running the software program and the module that are stored in the memory 120. The memory 120 may mainly include a program storage area and a data storage area. The program storage area may store an operating system, an application program that is required by at least one function (such as a sound playing function or an image playing function), and the like. The data storage area may store data (such as audio data or a phonebook) that is created based on use of the terminal, and the like. In addition, the memory 120 may include a high-speed random access memory, or may include a non-volatile memory, such as at least one magnetic disk storage device, a flash memory device, or another volatile solid-state storage device.

The another input device 130 may be configured to receive an input number or character information, and generate a key signal input related to user settings and function control of the terminal. Specifically, the another input device 130 may include, but is not limited to: one or more of a physical keyboard, a function key (such as a volume control key or an on/off key), a trackball, a mouse, a joystick, an optical mouse (the optical mouse is a touch-sensitive surface that does not display visual output, or an extension of a touch-sensitive surface formed by a touchscreen), and the like. The another input device 130 is connected to another input device controller 171 in the input/output subsystem 170, and performs signal exchange with the processor 180 under the control of the another input device controller 171.

The display screen 140 may be configured to display information that is input by a user or information provided for the user, and various menus of the terminal, and may further receive user input. Specifically, the display screen 140 may include a display panel 141 and a touch panel 142. The display panel 141 may be configured in a form of an LCD (Liquid Crystal Display, liquid crystal display), an OLED (Organic Light-Emitting Diode, organic light-emitting diode), or the like. The touch panel 142, also referred to as a touchscreen, a touch-sensitive screen, or the like, may collect a contact or contactless operation performed by the user on or near the touch panel 142 (for example, an operation performed by the user on or near the touch panel 142 by using any proper object or accessory such as a finger or a stylus, or a motion sensing operation. An operation type of the operation is a single-point control operation, a multipoint control operation, or the like), and may drive a corresponding connection apparatus based on a preset program. Optionally, the touch panel 142 may include two parts: a touch detection apparatus and a touch controller. The touch detection apparatus detects a touch orientation and gesture of the user, detects a signal brought by the touch operation, and sends the signal to the touch controller. The touch controller receives touch information from the touch detection apparatus, converts the touch information into information that can be processed by the processor, and then sends the information to the processor 180. The touch controller can receive and execute a command sent by the processor 180. In addition, the touch panel 142 may be implemented by using a plurality of types such as a resistive type, a capacitive type, infrared, and a surface acoustic wave. Further, the touch panel 142 may cover the display panel 141. The user may perform, based on content displayed on the display panel 141 (the displayed content includes but is not limited to a soft keyboard, a virtual mouse, a virtual key, an icon, and the like), an operation on or near the touch panel 142 that covers the display panel 141. After detecting the operation on or near the touch panel 142, the touch panel 142 sends the operation to the processor 180 by using the input/output subsystem 170 to determine user input. Then, the processor 180 provides, based on the user input, corresponding visual output on the display panel 141 by using the input/output subsystem 170. Although the touch panel 142 and the display panel 141 in FIG. 4 are used as two independent parts to implement input and input functions of the terminal, in some embodiments, the touch panel 142 and the display panel 141 may be integrated to implement the input and output functions of the terminal.

The terminal may further include at least one type of sensor 150, such as a light sensor, a speed sensor, a GPS sensor, and another sensor. Specifically, the light sensor may include an ambient light sensor and a proximity sensor. The ambient light sensor may adjust luminance of the display pane 141 based on brightness of ambient light. The proximity sensor may turn off the display panel 141 and/or backlight when the terminal moves to an ear. As a type of speed sensor, the acceleration sensor can detect a value of an acceleration in each direction (generally three axes), and detect a value and a direction of gravity when the acceleration sensor is static, and is applicable to an application for recognizing a terminal posture (for example, switching between a landscape screen and a portrait screen, relevant games, and magnetometer posture calibration), a function related to vibration recognition (such as a pedometer or a knock), and the like. Other sensors such as a gyroscope, a barometer, a hygrometer, a thermometer, and an infrared sensor may also be configured on the terminal. Details are not described herein.

The input/output subsystem 170 is configured to control an external input/output device, and may include the another input device controller 171, a sensor controller 172, and a display controller 173. Optionally, one or more other input device controllers 171 receive a signal from the another input device 130 and/or send a signal to the another input device 130. The another input device 130 may include a physical button (a press button, a rocker button, or the like), a dial pad, a slider switch, a joystick, a click scroll wheel, and an optical mouse (the optical mouse is a touch-sensitive surface that does not display visual output, or an extension of a touch-sensitive surface formed by a touchscreen). It should be noted that the another input device controller 171 may be connected to any one or more of the foregoing devices. The display controller 173 in the input/output subsystem 170 receives a signal from the display screen 140 and/or sends a signal to the display screen 140. After the display screen 140 detects user input, the display controller 173 converts the detected user input into interaction with a user interface object displayed on the display screen 140, to implement human-computer interaction. The sensor controller 172 may receive a signal from one or more sensors 150 and/or send a signal to one or more sensors 150.

The processor 180 is a control center of the terminal, and is connected to all parts of the entire terminal by using various interfaces and cables. The processor 180 runs or executes a software program and/or a module stored in the memory 120, and invokes data stored in the memory 120, to execute various functions of the terminal and process data, to perform overall monitoring on the terminal. Optionally, the processor 180 may include one or more processing units. Preferably, an application processor and a modem processor may be integrated into the processor 180. The application processor mainly processes an operating system, a user interface, an application program, and the like. The modem processor mainly processes wireless communication. It may be understood that the modem processor may alternatively be not integrated into the processor 180.

The terminal further includes the power supply 190 (such as a battery) that supplies power to each part. Preferably, the power supply may be logically connected to the processor 180 by using a power supply management system, so that functions such as charging, discharging, and power consumption management are implemented by using the power supply management system.

Although not shown in the figure, the terminal may further include a camera, a Bluetooth module, and the like. Details are not described herein.

Specifically, the processor 180 may invoke a program instruction stored in the memory 120, to implement the method shown in this embodiment of the present invention.

Specifically, the processor 180 invokes the program instruction stored in the memory 170 to perform the following steps:

detecting an environment parameter of a terminal and a terminal status parameter of the terminal;

determining a target situation event based on the environment parameter and/or the terminal status parameter; and if the environment parameter meets a first preset condition, and the terminal status parameter meets a second preset condition, triggering a terminal behavior corresponding to the target situation event.

The method performed by the processor in this embodiment of the present invention is described from a perspective of the processor. It may be understood that in this embodiment of the present invention, another hardware structure is needed to cooperate with the processor to perform the foregoing method. For example, the terminal interacts with another device or a server, for example, detects the environment parameter of the terminal. The processor 180 controls the sensor 150 to receive related data, and detects the terminal status parameter of the terminal. The processor 180 controls the another input device 130, the display screen 140, and the like to receive related data, determines the target situation event based on the environment parameter and/or the terminal status parameter, and triggers the terminal behavior corresponding to the target situation event. This may be implemented by the processor 803 by controlling a storage program in the memory 805. A specific implementation process is not described in detail and is not limited in this embodiment of the present invention.

Optionally, the terminal may implement, by using the processor 2000 and another device, corresponding steps performed by the terminal in the terminal behavior triggering methods in the embodiments corresponding to FIG. 1 and FIG. 4. It should be understood that this embodiment of the present invention is an entity apparatus embodiment corresponding to the method embodiments, and description of the method embodiments is also applicable to this embodiment of the present invention.

In this embodiment of the present invention, the terminal first detects the environment parameter and the status parameter, and then determines the target situation event based on the environment parameter and/or the terminal status parameter. If the environment parameter meets the first preset condition, and the terminal status parameter meets the second preset condition, the terminal triggers the terminal behavior corresponding to the target situation event. Both the environment parameter and the terminal status parameter are detected, so that the triggered terminal behavior better meets user expectation, thereby improving intelligence of the terminal.

Another embodiment of the present invention provides a computer readable storage medium. The computer readable storage medium stores a computer program. When the computer program is executed by a processor, the following steps may be implemented: detecting an environment parameter of a terminal and a terminal status parameter of the terminal; determining a target situation event based on the environment parameter and/or the terminal status parameter; and if the environment parameter meets a first preset condition, and the terminal status parameter meets a second preset condition, triggering a terminal behavior corresponding to the target situation event.

It should be noted that, for a specific process in which the computer readable storage medium is executed by the processor, refer to the methods described in the first embodiment and the second embodiment. Details are not described herein again.

Still another embodiment of the present invention provides a computer program product that includes an instruction. When the computer program product runs on a computer, the computer performs the following steps: detecting an environment parameter of a terminal and a terminal status parameter of the terminal; determining a target situation event based on the environment parameter and/or the terminal status parameter, and if the environment parameter meets a first preset condition, and the terminal status parameter meets a second preset condition, triggering a terminal behavior corresponding to the target situation event.

The computer readable storage medium may be an internal storage unit of the terminal in any one of the foregoing embodiments, for example, a hard disk or a memory of the terminal. The computer readable storage medium may alternatively be an external storage device of the terminal, for example, a removable hard disk, a smart media card (Smart Media Card, SMC), a secure digital (Secure Digital, SD) card, a flash card (Flash Card), and the like that are configured on the terminal. Further, the computer readable storage medium may alternatively include both the internal storage unit and the external storage device of the terminal. The computer readable storage medium is configured to store the computer program and other programs and data required by the terminal. The computer readable storage medium may be further configured to temporarily store data that has been output or is to be output.

It should be noted that, for a specific implementation process of the computer program product that includes the instruction, refer to the methods described in the first embodiment and the second embodiment. Details are not described herein again.

Based on a same inventive concept, a problem-resolving principle of the terminal provided in this embodiment of the present invention is similar to that of the method embodiments of the present invention. Therefore, for implementation of the terminal, refer to the implementation of the methods. For brevity of description, details are not described herein again.

A person of ordinary skill in the art may understand that all or some of the procedures for implementing the methods in the foregoing embodiments may be implemented by a computer program instructing relevant hardware. The program may be stored in a computer readable storage medium. When the program runs, the procedures of the method embodiments are performed. The storage medium may be a magnetic disk, an optical disc, a read-only memory (Read-Only Memory, ROM), a random access memory (Random Access Memory, RAM), or the like.

What is claimed is:

1. A method, comprising:
    obtaining, by a system, a first environment parameter and a first terminal status parameter, wherein the first environment parameter comprises location information indicating a location of a user of the system, and wherein the first terminal status parameter comprises running program status parameter;
    determining, by the system, a first target situation event based on the first environment parameter;
    displaying, by the system, first prompt information when the first environment parameter meets a first preset location condition, and the first terminal status parameter meets a first preset running program condition;
    obtaining, by the system, a second environment parameter and a second terminal status parameter, wherein the second environment parameter comprises motion information, and wherein the second terminal status parameter comprises information obtained from a microphone;
    determining, by the system, a second target situation event based on the second environment parameter and second terminal status parameter;
    displaying, by the system, second prompt information when the second environment parameter meets a first preset condition, and the second terminal status parameter meets a second preset condition; and
    displaying third prompt information when the second environment parameter meets the first preset condition, and the second terminal status parameter meets a third preset condition; or displaying fourth prompt information when the second environment parameter meets a fourth preset condition, and the second terminal status parameter meets the second preset condition.

2. The method according to claim 1, wherein the system comprises a wearable device.

3. The method according to claim 1, wherein the first environment parameter is obtained from a global positioning system (GPS) sensor.

4. The method according to claim 1, the first environment parameter meeting the first preset location condition comprising:
    the first environment parameter meeting the first preset location condition and time duration meeting a first preset time.

5. The method according to claim 1, wherein the displaying the first prompt information comprises:
    lighting up a screen; and
    displaying the first prompt information.

6. The method according to claim 1, wherein the displaying the second prompt information comprises:
    lighting up a screen; and
    displaying the second prompt information.

7. A system, comprising:
    at least one processor; and
    a non-transitory computer readable storage medium storing programming, the programming including instructions that, when executed by the system, cause the system to perform operations, the operations including:
        obtaining a first environment parameter and a first terminal status parameter, wherein the first environment parameter comprises location information indicating a location of a user of the system, and wherein the first terminal status parameter comprises running program status parameter;
        determining a first target situation event based on the first environment parameter;
        displaying first prompt information when the first environment parameter meets a first preset location condition, and the first terminal status parameter meets a first preset running program condition;
        obtaining a second environment parameter and a second terminal status parameter, wherein the second environment parameter comprises motion information and the second terminal status parameter comprises information obtained from a microphone;

determining a second target situation event based on the second environment parameter and second terminal status parameter;

displaying second prompt information when the second environment parameter meets a first preset condition, and the second terminal status parameter meets a second preset condition; and displaying third prompt information when the second environment parameter meets the first preset condition, and the second terminal status parameter meets a third preset condition; or displaying fourth prompt information when the second environment parameter meets a fourth preset condition, and the second terminal status parameter meets the second preset condition.

8. The system according to claim 7, wherein the system comprises a wearable device.

9. The system according to claim 7, wherein the first environment parameter is obtained from a global positioning system (GPS) sensor.

10. The system according to claim 7, the first environment parameter meeting the first preset location condition comprising:

the first environment parameter meeting the first preset location condition and time duration meeting a first preset time.

11. The system according to claim 7, wherein the displaying the first prompt information comprises:

lighting up a screen; and displaying the first prompt information.

12. The system according to claim 7, wherein the displaying the second prompt information comprises:

lighting up a screen; and displaying the second prompt information.

13. A non-transitory computer program product that comprises instructions, wherein when the instructions run on a system, the instructions cause the system to perform operations, the operations including:

obtaining a first environment parameter and a first terminal status parameter, wherein the first environment parameter comprises location information indicating a location of a user of the system, and wherein the first terminal status parameter comprises running program status parameter;

determining a first target situation event based on the first environment parameter;

displaying first prompt information when the first environment parameter meets a first preset location condition, and the first terminal status parameter meets a first preset running program condition;

obtaining a second environment parameter and a second terminal status parameter, wherein the second environment parameter comprises motion information, and wherein the second terminal status parameter comprises information obtained from a microphone;

determining a second target situation event based on the second environment parameter and second terminal status parameter;

displaying second prompt information when the second environment parameter meets a first preset condition, and the second terminal status parameter meets a second preset condition; and displaying third prompt information when the second environment parameter meets the first preset condition, and the second terminal status parameter meets a third preset condition; or displaying fourth prompt information when the second environment parameter meets a fourth preset condition, and the second terminal status parameter meets the second preset condition.

14. The non-transitory computer program product according to claim 13, wherein the system comprises a wearable device.

15. The non-transitory computer program product according to claim 13, wherein the first environment parameter is obtained from a global positioning system (GPS) sensor.

16. The non-transitory computer program product according to claim 13, the first environment parameter meeting the first preset location condition comprising:

the first environment parameter meeting the first preset location condition and time duration meeting a first preset time.

17. The non-transitory computer program product according to claim 13, wherein the displaying the first prompt information comprises:

lighting up a screen; and displaying the first prompt information.

18. The method of claim 1, the first prompt information prompting the user to perform a new activity.

19. The system of claim 7, the first prompt information prompting the user to perform a new activity.

20. The non-transitory computer program product of claim 13, the first prompt information prompting the user to perform a new activity.

\* \* \* \* \*